US005816568A

United States Patent [19]
Fox

[11] Patent Number: 5,816,568
[45] Date of Patent: Oct. 6, 1998

[54] COMPONENT HOLDING SYSTEM

[76] Inventor: Phillip S. Fox, 7140 Suntide Pl., Colorado Springs, Colo. 80919

[21] Appl. No.: 746,479

[22] Filed: Nov. 12, 1996

[51] Int. Cl.[6] .......... B23Q 3/18

[52] U.S. Cl. .......... 269/60; 269/71; 269/246; 269/243; 269/296; 269/152; 269/156; 269/111; 269/63; 269/64; 269/283

[58] Field of Search .......... 269/53, 60, 71, 269/111, 172, 189, 240, 243, 246, 247, 296, 298, 300, 301, 45, 47, 50, 51, 65, 121, 261, 262, 279, 280, 282, 283, 152, 156, 63, 64

[56] References Cited

U.S. PATENT DOCUMENTS

| | | | |
|---|---|---|---|
| 167,572 | 9/1875 | Seaver | 269/279 |
| 568,543 | 9/1896 | Parks | 269/45 |
| 706,531 | 8/1902 | Couch et al. | 269/71 |
| 783,031 | 2/1905 | Fell | 269/71 |
| 1,368,085 | 2/1921 | Womack | 269/80 |
| 1,412,961 | 4/1922 | Periolat | 269/282 |
| 1,498,638 | 6/1924 | Periolat | 269/282 |
| 2,459,080 | 1/1949 | Killius | 269/71 |
| 3,061,936 | 11/1962 | De Dobbeleer | 269/71 |
| 4,949,944 | 8/1990 | Groff, Sr. | 269/296 |
| 5,215,296 | 6/1993 | Adams et al. | 269/60 |

*Primary Examiner*—Robert C. Watson
*Attorney, Agent, or Firm*—G. F. Gallinger

[57] ABSTRACT

A lightweight component holding system which is simple to use, and in which an irregularly component may be readily positioned and repositioned for light assembly or inspection is disclosed. The system comprises: a side assembly having an elongated base having opposite ends and having; a carriage laterally slidable and lockable on the base, said carriage having; an upright column rotatably and lockably mounted on the carriage, said column having; a slide vertically and lockably slidable on the column, said slide having; an advancing shaft having a front projecting end having a component holding means attached thereto. At least three, and preferably four side assemblies have their opposite end portions interconnected so that they together form a stable planar component holding system, having a base center opening. In a preferred embodiment the advancing shaft comprises a holding means screw having a turning wheel on a rear end portion thereof.

20 Claims, 1 Drawing Sheet

COMPONENT HOLDING SYSTEM

FIELD OF INVENTION

Figure 1:
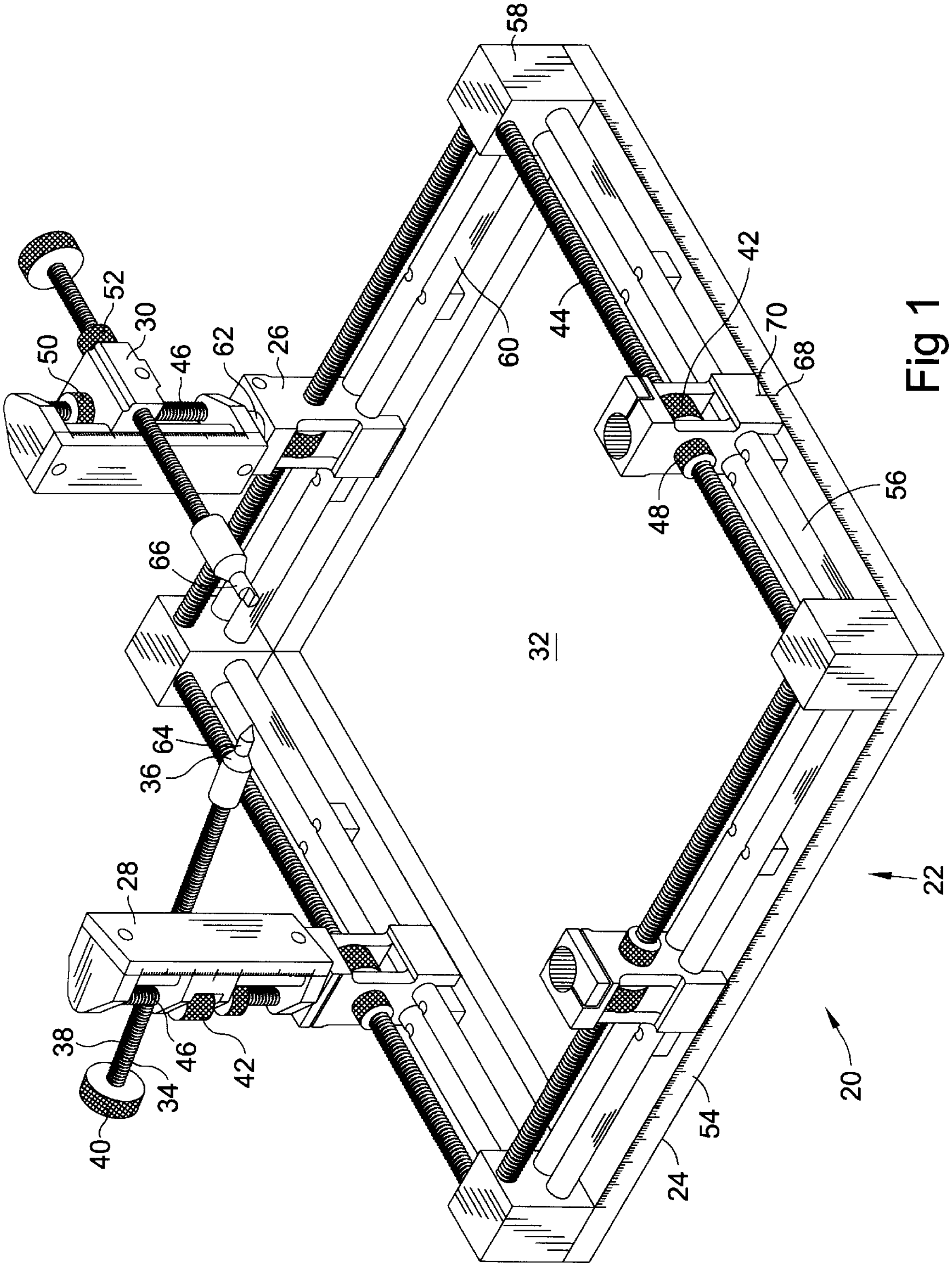

This invention relates to clamping systems used to rigidly hold components of varying shapes and sizes in any selected position for light assembly thereon, or inspection there-around.

BACKGROUND OF THE INVENTION

Conventional general purpose component holding systems typically comprise a peg board type base to which varying heights of towers having multiple adjustable clamping arms may be mounted. One problem with this type of system is that it is bulky and heavy. Another problem is that it is considerably challenging to configure. And after a part is mounted therein, it is difficult to reposition that part or even view it from all sides. What is needed is a component mounting system which has less bulk, and fewer parts. A system which is simple to use, and in which a component may be readily repositioned.

OBJECTS AND STATEMENT OF INVENTION

It is an object of this invention to disclose a system of holding components which is simple to use. It is an object of this invention to disclose a system which may rigidly hold any shape of component in almost any position. It is yet a further object of this invention to disclose a system which not only facilitates initial mounting, but allows a held component to be readily rotated, or otherwise the repositioned. It is yet a further object of this invention to disclose a system which holds a component in such a manner that it can be viewed from all sides. It is a final object of this invention to disclose a component holding system which is lightweight, intuitively obvious to use, and which has a minimal number of specialized parts which are not of general application.

One aspect of this invention provides for a component holding system comprises: a side assembly having an elongated base having opposite ends and having; a carriage laterally slidable and lockable on the base, said carriage having; an upright column rotatably and lockably mounted on the carriage, said column having; a slide vertically and lockably slidable on the column, said slide having; an advancing shaft having a front projecting end having a component holding means attached thereto. At least three, and preferably four side assemblies have their opposite end portions interconnected so that they together form a stable planar component holding system, having a base center opening.

Another aspect of this invention provides for a system as above wherein the advancing shaft comprises a holding means screw having a turning wheel on a rear end portion thereof.

Various other objects, advantages and features of novelty which characterize this invention are pointed out with particularity in the claims which form part of this disclosure. For a better understanding of the invention, its operating advantages, and the specific objects attained by its users, reference should be made to the accompanying drawing and description, in which preferred embodiments of the invention are illustrated.

FIGURES OF THE INVENTION

The invention will be better understood and objects other than those set forth will become apparent to those skilled in the art when consideration is given to the following detailed description thereof. Such description makes reference to the annexed drawing wherein:

FIG. 1 is a perspective view of a component holding system having only two of four columns positioned thereon.

The following is a discussion and description of the preferred specific embodiments of this invention, such being made with reference to the drawing, wherein the same reference numerals are used to indicate the same or similar parts and/or structure. It should be noted that such discussion and description is not meant to unduly limit the scope of the invention.

DESCRIPTION OF THE INVENTION

Turning now to the drawing and more particularly to FIG. 1 we have a perspective view of a component holding system 20 having only two of four columns positioned thereon. The component holding system comprises: a side assembly 22 having an elongated base 24 having opposite ends and having; a carriage 26 laterally slidable and lockable on the base 24, said carriage 26 having; an upright column 28 rotatably and lockably mounted on the carriage 26, said column 28 having; a slide 30 vertically and lockably slidable on the column 28, said slide 30 having; an advancing shaft 34 having a front projecting end having a component holding means 36 attached thereto. At least three side assemblies 22 have their opposite end portions interconnected so that they together form a stable planar seating component holding system 20, having a base center opening 32.

In the preferred embodiment of the invention four elongated bases 24 have their opposite end portions perpendicularly interconnected so that they together form a stable planar rectangular component holding system 20 having a rectangular base center opening 32. This base center opening facilitates inspection of a bottom side portion of a component (not shown) held between the columns 28. In the preferred embodiment of the invention the advancing shaft 34 comprises a holding means screw 38 having a turning wheel 40 on a rear end portion thereof. Similarly the carriage 26 may be slidably moved along the base 24 by a turning wheel 42 on a stationary base screw 44 which is fixed with respect to the base 24, and which extends through the carriage. Similarly the slide 30 may be slidably moved along the column 28 by a turning wheel 42 on a column screw 46 which is fixed with respect to the column 28, and extends through the slide 30. Most preferably a carriage lock wheel 48 which is threaded on the stationary base screw 44; a slide lock wheel 50 which is threaded on the column screw 46; and a holding means lock wheel 52 which is threaded on the holding means screw 38; are provided to ensure more rigid and non-loosening locking.

Most preferably the base 24 comprises a lateral member 54 and a guide track 56 and said carriage 26 is mated to fit around and slide on the guide track 56. A corner post 58 which holds opposite ends of the stationary screw 44 and two stationary base rods 60, which are laterally positioned beneath the stationary screw 44 and extend through the carriage 26, provide the carriage 26 with stability.

The screws 38,44,46, the turning wheels 42, the lock wheels 48,50,52, the rods 60,62 and the component holding means 36 are made of hard steel. The elongated base 24, carriage 26, columns 28, slide 30 and post 58 are made of aluminum which is anodized.

The column 28 is fastened to the carriage 26 by means of a vertical bar 62 having a multi-sided cross section, so that the column 28 may be lifted vertically, rotated an increment through an angle which is a fraction of a rotation, and then reseated on the carriage 26, rotatably locked into position thereon. In the preferred embodiment the cross section of the bar 62 has twenty-four equal peripheral flat sides so that the column 28 may be rotated in a multiple of 15 degree increments. In some applications it should be noted that it may be advantageous to move a carriage 26 so that more than one carriage 26 and more than one column 28 may be on any one side assembly. It also should be noted a slide 30 may be mounted directly on the stationary base screw 44 to allow the holding means screw 38 and holding means 36 to be positioned lower.

The holding means screw 38 has a front end portion adapted to screw to a component holding means 36 which may be either a conical tip 64, a peg 66 having a front end portion and having a longitudinally extended lower front end portion so that support may be provided while tightening the holding screw 38 or a clamp (not shown).

The component holding system 20 is now manufactured having rectangular openings 32 of 4" by 4", 4" by 8", and 8" by 8". Coordinate etchings 68 may be made along the elongated bases 24, and on both sides of the columns 28, along with corresponding centermarks 70 on the carriage 26 and slide 30.

The component holding system enables one to readily and rigidly hold components (not shown) of varying shapes and sizes in any selected position for light assembly thereon, or inspection therearound.

While the invention has been described with preferred specific embodiments thereof, it will be understood that this description is intended to illustrate and not to limit the scope of the invention. The optimal dimensional relationships for all parts of the invention are to include all variations in size, materials, shape, form, function, assembly, and operation, which are deemed readily apparent and obvious to one skilled in the art. All equivalent relationships to those illustrated in the drawings, and described in the specification, are intended to be encompassed in this invention. What is desired to be protected is defined by the following claims.

I claim:

1. A component holding system comprising:

three side assemblies, each having an elongated base having opposite ends, said base having;

a carriage laterally slidable and lockable on the base, said carriage having;

an upright column rotatably and lockably mounted on the carriage, said column having;

a slide vertically and lockably slidable on the column, said slide having;

an advancing shaft having a front projecting end having a component holding means attached thereto;

wherein the three side assemblies have their opposite end portions connected so that they together form a stable planar component holding system, having a base center opening.

2. A component holding system as in claim 1 further comprising a fourth side assembly:

wherein the four elongated bases have their opposite end portions perpendicularly interconnected so that they together form a stable planar rectangular component holding system having a rectangular base center opening.

3. A system as in claim 2 wherein the advancing shaft comprises a holding means screw having a turning wheel on a rear end portion thereof.

4. A system as in claim 3 wherein the carriage may be slidably moved along the base by a turning wheel on a stationary base screw which is fixed with respect to the base, and extends through the carriage.

5. A system as in claim 4 further comprising a carriage lock wheel threaded on the stationary base screw.

6. A system as in claim 4 wherein the slide may be slidably moved along the column by a turning wheel on a column screw which is fixed with respect to the column, and extends through the slide.

7. A system as in claim 6 further comprising a slide lock wheel threaded on the column screw.

8. A system as in claim 6 further comprising a holding means lock wheel threaded on the holding means screw.

9. A system as in claim 4 wherein the base comprises a lateral member and a guide track and wherein said carriage is mated to fit around and slide on the guide track.

10. A system as in claim 4 wherein each base further comprises a corner post on one end so that when the bases are connected the corner posts are spaced by the bases and hold opposite ends of the stationary base screws.

11. A system as in claim 10 further comprising a stationary base rod having an end held by the post, and extending through the carriage thereby providing the carriage with stability.

12. A system as in claim 11 having two base rods laterally positioned beneath the stationary screw.

13. A system as in claim 12 wherein the screws, the turning wheels, the lock wheels, the rod and the holding means are made of steel.

14. A system as in claim 13 wherein the base assemblies, carriages, columns, slides, and posts are made of aluminum.

15. A system as in claim 14 wherein the aluminum is anodized.

16. A system as in claim 13 wherein the column is fastened to the carriage by means of a vertical bar having a multi-sided cross section, so that the column may be lifted vertically, rotated an increment through an angle which is a fraction of a rotation, and then reseated on the carriage, rotatably locked into position thereon.

17. A system as in claim 16 wherein the cross section of the bar has twenty-four equal peripheral flat sides so that the column may be rotated in a multiple of 15 degree increments.

18. A system as in claim 12 wherein the holding means screw has a front end portion adapted to screw to a component holding means.

19. A system as in claim 18 wherein the component holding means is a conical tip.

20. A system as in claim 18 wherein the component holding means is a peg having a longitudinally extended lower front end portion so that support may be provided while tightening the holding screw.

* * * * *